April 28, 1959     N. KRASNEY     2,884,110
PACKAGED GOODS DISPENSING MACHINE
Filed Dec. 16, 1953     2 Sheets-Sheet 1
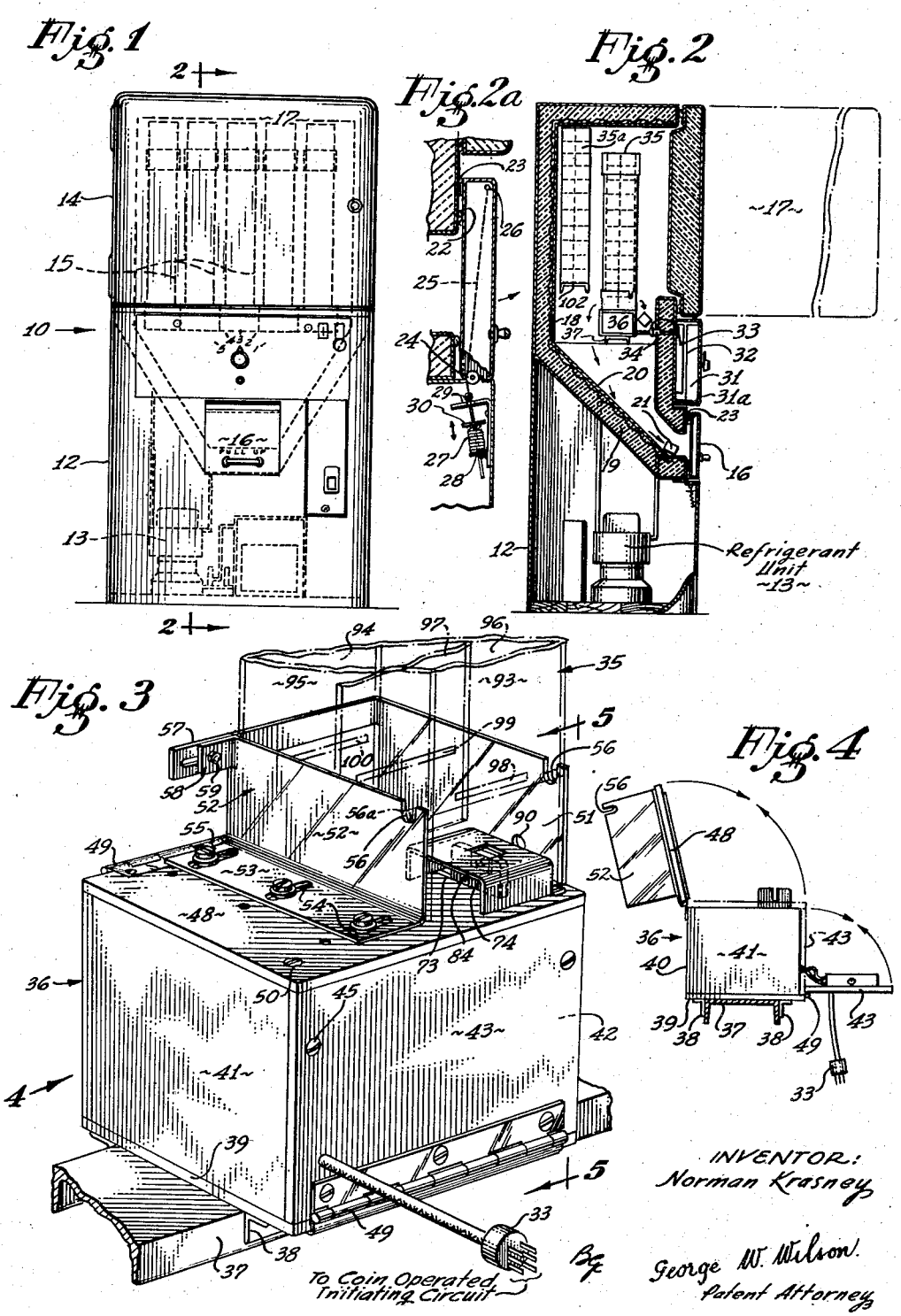

April 28, 1959 N. KRASNEY 2,884,110
PACKAGED GOODS DISPENSING MACHINE
Filed Dec. 16, 1953
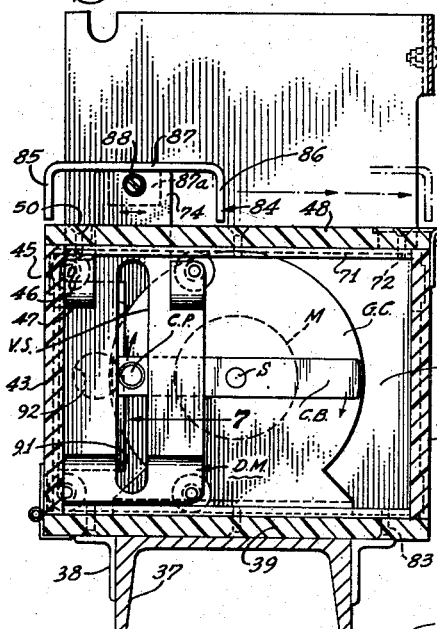
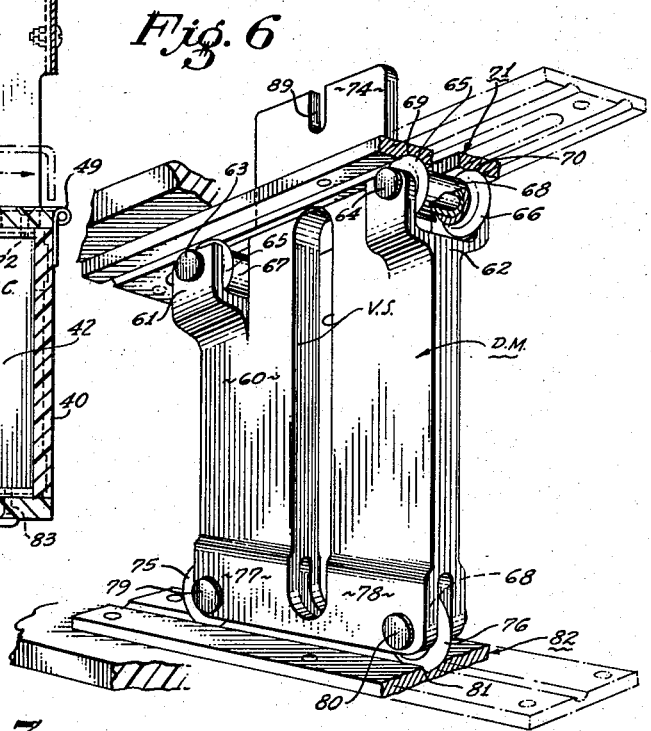
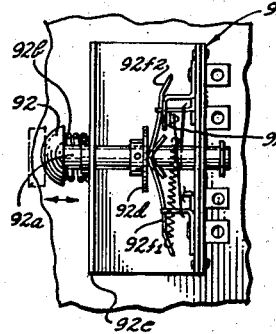
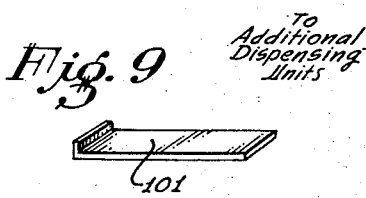
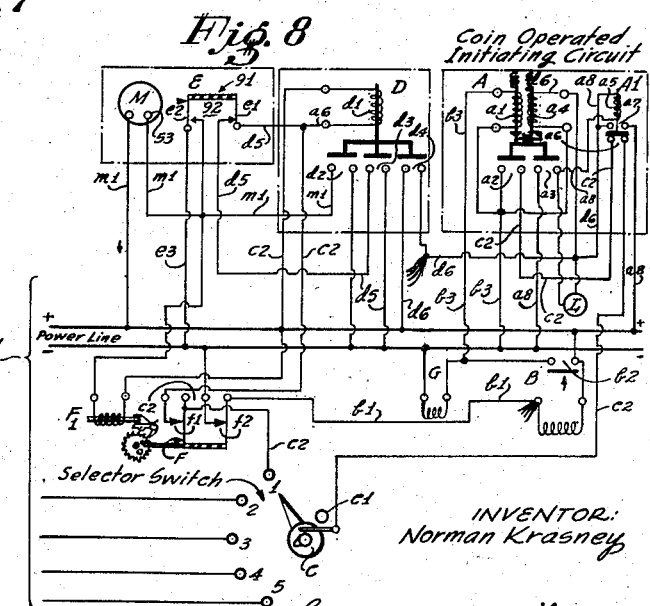
INVENTOR:
Norman Krasney
By George W. Wilson.
Patent Attorney

United States Patent Office 2,884,110
Patented Apr. 28, 1959

2,884,110
PACKAGED GOODS DISPENSING MACHINE

Norman Krasney, Los Angeles, Calif.

Application December 16, 1953, Serial No. 398,491

3 Claims. (Cl. 194—10)

My invention relates to machines designed to dispense packaged products and particularly to such products in refrigerated condition. It is to be understood however that the dispensing mechanism of my invention may be utilized for vending products packed in uniform sizes of container in a number of stacks though the size of package may be different in different stacks, and that the dispensed products may not require refrigeration. The sepecific description which is given relates to refrigerated products, since this is an important field but is given by way of example only.

Food and confections packed in individual containers and maintained in frozen or refrigerated condition until sold, enjoy a very wide and increasing sale and various machines have been devised to dispense them, including coin operated and electrically driven machines, but because of the various requirements required to be met in use they are complicated, and costly to manufacture and maintain.

It is an object of my invention to provide a machine of simple construction for dispensing frozen or other packaged comestibles such as ice cream, so arranged that it will function efficiently for long periods without attention and may be very quickly and easily serviced to keep it stocked with such comestibles.

It is a further object of my invention to provide a dispensing machine incorporating a number of unitized mechanisms so assembled that an individual unit mechanism may be removed for repair in a minimum of time and replaced by a corresponding spare unit so enabling the machine to be kept in substantially continuous operation.

Another object of the invention is to provide a dispensing machine for refrigerated comestibles which may readily be adjusted to dispense packages of a variety of package sizes.

An important object of the invention is to provide mechanism for ejecting packages from containers or cartridges in which a double stack of the package is held, which mechanism is simple and positive in action and is unaffected in its functioning by comparatively low temperatures to which it may be subjected.

Still further objects and features of the invention will hereinafter appear from a reading of the following description in conjunction with the accompanying drawings which illustrate an embodiment of the invention at present considered preferable by me.

In the drawings:

Figure 1 is a front elevation of a preferred embodiment of the dispensing machine of my invention;

Figure 2 is a cross-section on the line 2—2 in Figure 1;

Figure 2a is a fragmentary detail view on an enlarged scale of a means for normally holding closed the closure through which packaged comestibles or other goods are withdrawn from the machine after release from cartridges holding stacks of such packages;

Figure 3 is a perspective view on an enlarged scale of a single operating unit with a cartridge or container for a double tier of packages to be dispensed, mounted on the unit, the cartridge being broken off to reduce its height;

Figure 4 is a detail view in side elevation showing how the top and front of each operating unit may be opened to provide access to the mechanism contained therein;

Figure 5 is a cross section on the line 5—5 in Figure 3;

Figure 6 is an enlarged detail view of a reciprocated package dispensing member mounted within each operating unit;

Figure 7 is a fragmentary view of a switch, shown on an enlarged scale, mounted within each operating unit and automatically actuated, by a member acting to reciprocate the dispensing member, at the point when said member is moved to the limit of its travel in either direction;

Figure 8 is a wiring diagram showing the arrangement of electrical elements provided to operate the machine as a whole and each operating unit thereof; and Figure 9 is a perspective view of a member used during the positioning of cartridges in operative position in the machine.

Referring now to Figure 1, the numeral 10 indicates the dispensing machine as a whole, the lower portion 12 of which may contain a refrigerating machine 13 of usual construction, and the upper portion 14 of the machine containing a supply of packaged goods 15 such as frozen ice cream, and mechanism for delivering one package therefrom at a time, which packages are withdrawn by the purchaser through a door 16. The package storing and delivering mechanism will be later fully explained.

The upper portion of the machine cabinet is provided with a door 17 through which the packaged goods may be inserted in the machine, and empty package holding cartridges may be removed.

Various other doors which are provided in the dispenser cabinet will be described as the specification proceeds.

The construction and interior arrangement of the dispenser cabinet will be first described. The cabinet may be formed in any convenient manner, as for instance of welded sheet metal. The upper portion 14 of the cabinet may be double walled, and the inner wall 18 may be provided with refrigerant coils, or preferably, as shown in Figure 2, formed of two sheets, the sheet forming the face of the refrigerated space being smooth surfaced, while the sheet adhered to the back thereof is stamped with a continuous back and forth groove providing a channel for refrigerant, such as Freon vapor, which is circulated therethrough. I prefer to form the back and sides of the cabinet as described. The space between the back wall of the cabinet and the inner wall is filled with heat insulating material 19 such as "Fiberglas" or other suitable substance. The top, front and bottom of the cabinet need not be provided with refrigerant coils but are provided with heat insulating material between the inner and outer walls.

The bottom 20 of the refrigerated portion of the cabinet is inclined inwardly and downwardly from the sides and back, as shown in Figure 2, forming a chute leading dispensed packages to a delivery throat 21 from which they may be taken out by opening door 16.

Since it is desired to exclude outside air from the interior of the cabinet provision is made for keeping the door 16 under resilient pressure against a rubber seal 22 arranged around the door opening.

While I may arrange resilient means tending to hold the door closed in various ways, the arrangement shown in detail in Figure 2a is preferred. The door 16 is pivoted at 23 at its upper inner edge to the recessed front wall at the door opening. A pulley 24 is mounted in a cut-out at the bottom of the throat 21 at each side of the door. Flexible metal strips 25 are secured at their upper end to attachments 26 screwed into the edges of the door well above mid way of its height. The strips are passed around the pulleys, pass through holes in the forward bottom edge of the delivery end of throat 21 and are secured to the upper ends of coil springs 27, the lower ends of the springs being secured to bracket arm 28 projecting inwardly from and secured to the wall of the cabinet.

The strips pass through openings in upper bracket arms 29, also projecting inwardly from and secured to the cabinet, before being secured to springs 27, sufficient space being provided between the arms and the upper end of the springs to permit the elongation of the springs when the door 16 is opened. The engagement of washers 30, resting on the upper ends of springs 27, with bracket arms 29 are effective to limit the opening movement of the door.

It will be noted that the front wall of the upper portion of the cabinet is displaced inwardly for a distance providing a space 31 in which is arranged electrical controlling means for the individual dispensing units, which means together with the mechanism of the dispensing units, will be later described in detail. Space 31 contains an insulated panel 32 on which electrical elements are mounted, and the space 31 is covered by a door 31a secured in place by any suitable means.

Plug sockets 34 are mounted on the inner side of the insulated front wall of the cabinet with their wire leads passing through the insulation into the space 31 and connected to the electrical elements mounted on panel 32. Connector plugs 33 are connected to plug sockets 34 when units 36 are placed in operative position.

The space within the refrigerated portion of the cabinet is deep enough from front to back to receive a reserve of cartridges 35a containing packages to be dispensed, as well as a bank of cartridges 35 mounted on individual dispensing units, each generally indicated by the numeral 36.

The width of the cabinet may be made sufficient to accommodate a desired number of units, as for instance five, each containing packaged ice cream for instance of a particular flavor.

The units 36 are freely mounted in spaced side by side arrangement on a supporting shelf 37 extending from one side to the other of the refrigerated space. The bottoms of the units 36 (see Figure 4) are provided with angle strips 38 engaging with the edges of the shelf 37 and preventing the units from moving transversely of the length of the shelf, or rocking back and forth in that direction, the units may however be readily lifted off the shelf if required by moving them a small distance upwardly.

The dispensing units 36 are formed as rectangular boxes having a bottom 39, back 40, and sides 41, 42 permanently secured together. The front wall 43 is pivotally connected to the bottom 39 by a piano type hinge 49 and held in erected position, for instance, by quick release fasteners 45 engaging with co-operating parts 46 mounted on small brackets 47 secured to the side walls. The top 48 is hinged to the back 40 by a piano type hinge 49, held in erected position by similar quick release fasteners 50 engaging with co-operating parts 46 also mounted on the small brackets 47. In closed position the dispensing units 36 form rigid bases for detachably supporting a cartridge 35 thereon and for mounting dispensing mechanism arranged therein, yet when the cartridge is removed and the top and front of the unit is opened, full access is provided to the mechanism contained in the unit.

The cartridge 35 is retained on the top 48 by a pair of brackets 51, 52, one of the said brackets 51 being formed as a plate secured to one side of the unit and projecting upwardly therefrom. The other brackets 52 is formed as a plate having a flange 53 at right angles thereto resting on the top of the unit and arranged so that it may be adjusted toward and from bracket 51. Adjustment is effected by providing slots 54 in the flange 53 through which hold down screws 55 extend and are screwed into the top 48.

Notches 56 are provided at equal heights near the top of the front edges of bracket plates 51 and 52. A back bar 57 extends from plate 51 and is adjustably secured to bracket plate 52 by lying against a projection 58 bent out from the upper portion of the rear edge of plate 52. The free end of bar 57 is slotted and the bar 57 is clamped to projection 58 by a hold down screw 59 passing through the slot and screwed into projection 58. It will be noted that the lower edge of the back bar is spaced well above the top 48 of the unit for a purpose that will later appear.

The construction of the cartridges 35 will be explained later but it may be here stated that they are simply stood on end, fitting between the plates 51 and 52, and that packaged comestibles or other goods are discharged therefrom alternately to the front and to the rear of the unit, passing through the open front side of the bracket, and under the back bar thereof, respectively.

The mechanism contained in each unit 36 is most clearly shown in Figures 5, 6, and 7. The driving motor M is provided with a gear case GC driving a shaft S on which is fixed a crank bar CB carrying a crank pin CP which works in a vertical slot VS in a dispensing member, generally indicated at DM, which is reciprocated from one end of its travel to the opposite end at each half revolution of the crank bar CB.

The dispensing member DM, shown in detail in Figure 6, consists of a rectangular plate 60 formed with a yoke 61 and 62 at each upper corner. Pivot pins 63, 64 are mounted in each yoke and a pair of guide wheels 65 and 66 are mounted on the pivot pins 63 and 64 respectively, the guide wheels or rollers being spaced apart by sleeves 67, 68.

The edges of the guide wheels run in parallel grooves 69, 70 in a guide bed member 71 secured as by screws 72 to the lower face of the top 48 of the unit. The top 48 is formed with a longitudinal slot 73 (Figure 3) through which projects an extension 74 of the dispensing member 59.

The member DM is held vertical and guided for movement by guide wheels 75, 76 mounted in double walled bearing portions 77, 78 at the lower corners of member DM on pivot pins 79 and 80 extending through said bearing portions. It should be noted that the upper and lower guide wheels are provided with "Oilite" type lubricated bearings.

The lower guide wheels run in a grove 81 provided in a guide bed member 82 secured to the bottom 39 of the unit as by screws 83.

A pusher element generally indicated at 84 (Figure 5) is mounted on the projection 74 of the dispensing member as shown in Figures 3 and 5 to move back and forth across the upper surface of the top of the unit. The pusher element 84 is formed with vertical front and back faces 85 and 86 respectively connected by a horizontal supporting surface 87 from which a projection 87a is struck out to extend vertically downward.

The pusher element 84 is detachably secured in horizontal position on the projection 74 with the lower edges of the front and back surfaces 85 and 86 above the top of the unit by means of a screw 88 passed through a nut staked into the projection 87a and passed through a vertical slot 89 running downward from the upper horizontal edge of the projection 74. The screw may be tightened or slacked back by a screw driver the blade of which may be inserted through holes 90 in side wall 51 positioned at the ends of the travel of the pusher element 84. It will be noted that after the cartridge has been lifted out of position on the top of the unit, and the screw 88 slacked back, the pusher element may also be lifted off enabling the top and front of the unit to be swung into open position to give access to the interior of the unit.

A double pole single throw switch generally indicated at 91 in Figure 5 and shown in Figure 7, is operated at each half revolution of the crank bar CB, at which time the dispensing member DM is at the forward or backward limit of its motion. One end or the other of the bar strikes the switch operating push button 92, which is provided with a semi-spherical head and which engages in a tangential manner with the ends of the bar CB, whereby the stem 92a is displaced inwardly by this engagement against the resistance of a spring 92b arranged between the head 92 and a bracket 92c through which the stem 92a is passed. A washer 92d is mounted on stem 92a to engage switch operating arms 92f1 and 92f2. The switch comprises a pair of spring loaded contacts 92e1 and 92e2 of which contact 92e2 is made before contact 92e1 is broken for which reason the operating arm 92f1 of contact 92e2 is arranged to first be engaged by washer 92d and arm 92f2 immediately thereafter.

The cartridges 35 are formed as elongated rectangular containers made of a suitable material such as a plastic having a pair of projecting studs 56a fitting into the notches 56. The lower ends of the cartridges are snugly fitted in the brackets 51, 52 on the top 48 of the unit, with the bottom edges resting on the top 48 of the unit 36. The cartridges are thus prevented from tipping forwardly by the back bar 57, or backwardly by the engagement of the studs 56a in the notches 56. The cartridge front and back walls 93 and 94 respectively terminate a sufficient distance above the sides 95 and 96 of the cartridge to allow packages to be dispensed from the cartridge below the lower edges of these walls. A center dividing wall 97 also terminates sufficiently above the lower edges of the sides of the unit to enable the pusher unit 84 to move under the dividing wall while preventing packages from moving from one stack to the other. Horizontally aligned slots 98, 99, 100 are provided through the front, center and back walls, near the lower edges thereof, to enable a flat loading strip 101 (Figure 9) to be inserted therethrough to hold the packages in the cartridge against falling out when the cartridge is being placed in position on the unit. Before being put in use loaded with packaged comestibles both upper and lower ends of the cartridge are preferably covered by removable caps (not shown) of plastic or other suitable material, the cap at the lower end being removed and the loading strip inserted before the cartridge is moved into a vertical position.

After the cartridge has been placed in the bracket on top of the unit, the loading strip is of course pulled out of the cartridge and the packages will fall into their dispensing position.

Spare loaded cartridges may be carried on a shelf 102 mounted on the back wall of the refrigerated space. The shelf is arranged at a height such that it does not obstruct the ejection of the packages from the back stack in the cartridges 35 mounted on the row of dispensing units 36.

A suitable circuit arrangement for operating the dispensing cabinet so far described is shown in the diagram of Figure 8.

The circuit illustrated in Figure 8 comprises:

(1) Elements required to operate each dispensing unit 36 and mounted therein, one of which is indicated in the circuit at E. These elements comprise the motor M and switch 91.

(2) Elements mounted in the recess 31 in the front wall of the cabinet, one of which is indicated at D, and comprise the multi contacts d2, d3, d4, and a resettable "stepper" motor F1 to operate a switch F. It is to be understood that there is one multi contact D, stepper motor F1 and switch F for each dispensing unit 36. The element of dispenser units 36 are connected to the elements mounted in the recess 31 by cable and plug to enable quick placement and replacement of an entire dispenser unit to be effected.

(3) Other elements mounted in the recess 31 as well as on the front of the cabinet comprise an initiating and coin-operated circuit common to all dispensing units. This circuit includes the multi-contacts generally indicated at A and A1, a coin-operated momentary-contact switch B, and a selector switch C, together with a starter button "C1" mounted on the front of the cabinet.

G indicates a counter totalling the number of items dispensed by the machine as indicated by coins accepted and is read at intervals similar to meter readings, and L indicates a lamp mounted on the front of the cabinet to indicate when the mechanism is out of order.

It will be obvious that other lights or signals may be arranged in various ways, as is well known in the art, to indicate that any one particular item, or flavor of ice cream for instance, has been exhausted.

The functioning of the circuit will be described during a cycle gone through at each operation of the machine by dropping a coin in the coin slot and pressing the starter button "C1," the selector arm C being placed on No. 1 contact. It should be noted that a coin circuit current of low power flows continuously through lead b1 and contact f2 until interrupted by stepper motor F1.

The coin will momentarily close contact b2 completing a circuit from one side of the line through lead b1, contact b2, lead b3, through the coil a1 of switch A, which closes contacts a2 and a3, which are latched mechanically in closed position, to the opposite side of the line. The re-opening of contact b2 therefore is of no effect on the functioning of the dispensing units although coil a1 is immediately de-energized.

The closing of switch C by pressure on starting button C1 completes a circuit from one side of the line through lead b3, contact a2, lead c2, contact a6 of switch A1, lead c2, contact f1 of normally closed switch f, coil d1 of switch D to the opposite side of the line. The energizing of switch D closes its contacts d2, d3, d4. A first holding circuit through coil d1 is established from one side of the line through lead d5, closed contact d3 and closed contact e1 of "make before break" switch 91 and lead c2 to the opposite side of the line, so that release of starter button c1 does not de-energize coil d1. A circuit for motor M has now been established from one side of the line through lead m1, closed contact d2 to the opposite side of the line. The energized motor rotates the crank bar CB fixed on the motor shaft S, turns through a half revolution performing the following sequence of operations, it being the case, as will appear, that at the termination of each movement of the crank bar CB the contact e1 of switch 91 is closed and contact e2 is open as shown in Figure 8.

Immediately after energization of motor M, the rotational movement of the cross bar CB carries it off the head of plunger 92 and releases the contact arms to the action of their springs and contacts 91e2 thereupon assumes its closed position, thereby providing a second path for current to motor M from the line through lead M1, motor M, contact e2, lead e3 to the opposite side of the line. Immediately thereafter, contacts 91e1 assumes its open position, de-energizing switch D, thus opening contacts d2, d3, and d4, and the motor continues to rotate through 180° until the opposite end of the crank bar CB engages with the head of plunger 92 of switch 91 and re-establishes the initial setting of the switch at E, the circuit of the motor M being interrupted by the re-opening of contact 91e2. Motor M is thus provided with power during each half revolution although switch D was deenergized when contact 91e1 was opened. After motor M is started and provided with circuits ensuring rotation through 180° as previously described, the initiating circuit should be de-energized and this is normally effected by a circuit from one side of the line through closed contact d4, lead d6, coil a4 through lead b3 to the opposite side of the line, if properly operative, energization of coil *a4* will release the mechanical latch and release contacts *a2*, *a3* to open position, and thus de-energize the initiating circuit. When contact *d4* is opened by de-energization of switch D as previously explained, coil *a4* will be de-energized.

A safety circuit A1 is provided which becomes operative should contacts *a2*, *a3* fail to be released, comprises a solenoid *a5* and the double pole-double throw switch the contacts *a6* of which have already been referred to as normally closed, these latter contacts are opened on energization of coil *a5* while contacts *a7* are closed. A circuit for the coil, which is only maintained should contacts *a3* remain closed, is provided by lead *a8* from one side of the line through contacts *a3* and coil *a5*, lead *d6*, contact *d4* to the opposite side of the line. Should contacts *a3* remain closed due to failure of the latch to release contacts *a2* and *a3*, the energization of coil *a5* opens contacts *a6* and closes contacts *a7* which affords a path for the current through the coil through lead *a8* thus holding the initiating circuit in in-operative condition while contacts *a6* are held open.

Lamp L is connected in parallel with coil *a5* of switch A1 so that it will be lighted when current flows through the coil and will remain lit indicating that the machine is out of order since the functioning of that circuit is necessary to operate any of the dispensing units 36.

The faulty portion of the circuit can be of course very readily corrected by an authorized maintenance man and the machine put back into operation.

F1 indicates the resettable stepper motor which is provided with a switch F having normally closed contacts *f1* and *f2*, the stepper motor F1 being connected across the power line through contacts 91*e2*. The stepper motor F1 is also provided with ratchet means having a number of teeth corresponding to the number of articles contained within the cartridge 35 with which it is associated. The ratchet means is also provided with a switch operating element which actuates switch F simultaneously with the actuation of the last tooth.

Stepper motor F1 is energized whenever contacts 91*e2* are closed by the operation of motor M, thus pulsing one step of the ratchet means for each article dispensed. As the last article is dispensed, the contacts *f1* and *f2* of switch F are opened by the switch operating element, thus opening the circuit of lead *c2* through selector switch *c1* (position 1), thereby obviating further operation of the particular dispensing unit until furnished with a new supply of articles and the ratchet means has been reset. The contacts *f2* of switch F are connected across the line in series with a standard coin acceptance and change giving mechanism B, of which momentary contact switch *b2* is a component part, by lead *b1* through a solenoid coil of the mechanism B. The solenoid coil will remain energized to permit coin acceptance as long as any contacts *f2* of switches F remain closed, since all such elements are connected in parallel. Suitable means may be installed to indicate when any individual dispensing unit has been cut out of the circuit by the opening of its contacts *f1* and *f2*. It will be understood, therefore, that when all dispensing units have been cut out of the circuit, the current to the solenoid coil of mechanism B will be automatically interrupted, and all coins inserted thereafter will be returned, by virtue of the standard coin acceptance mechanism B utilized. The machine is returned to operative condition by resetting the ratchet means of the stepper motors F1 when the machine is recharged with packaged goods.

The counter G is connected across the line through the momentarily closed coin operated switch B, it is therefore operated step by step by each coin accepted thus affording a check on the number of coins inserted which should tally with the total number of packages dispensed, in any given period.

It is to be understood that while a preferred embodiment of the invention has been specifically described and illustrated, it is to be understood that various modifications may be made therein by those skilled in the art without departing from the scope of the invention as intended to be defined by the appended claims.

What is claimed is:

1. A packaged goods dispensing machine comprising: a cabinet provided with means affording access to the interior thereof; a plurality of operating units removably arranged within said cabinet; a cartridge removably mounted on each operating unit and containing a double stack of packages delivered alternately from each stack by the operating unit on which it is mounted, an electric motor mounted in each operating unit and having a contact operating bar extending transversely of and mounted on an end of the motor shaft; a power line adapted to supply power to said motors, a coin acceptance circuit mounted on said cabinet; a normally open switch momentarily closed by the insertion of a coin, a selector switch, a relay operated latching circuit having two pairs of contacts one pair of contacts being placed in a circuit through the selector switch and the second pair of contacts in a delatching circuit, the closing of said coin closed switch completing a circuit from the power line through the relay operating the latching circuit and the selector switch to the circuit of a selected motor; a normally closed double pole switch in said motor circuit; a relay operated normally open triple contact switch in said circuit, the circuit through said selector switch being completed through one pair of contacts of said normally closed switch and the relay operating said triple contact switch to cause closing of the contacts thereof; one of the closed contacts of said triple contact switch establishing a holding circuit for the relay operating said triple contact switch to maintain energization of said relay when the momentarily closed coin operated switch is reopened; a make and break contact on said holding circuit operated by the contact operating bar on the motor shaft; a second of the contacts of the triple contact switch completing a first circuit from the power line through the motor, the contact operating bar of said motor after commencement of its rotation breaking the first motor circuit but establishing a second motor circuit through said make and break contact, and de-energizing the relay of said triple contact switch, the closing of the third contacts of said triple contact switch completing a circuit through the second pair of contacts of the latching circuit to delatch said two pairs of contacts of the delatching circuit, and break the operating circuit of the motor.

2. An operating circuit as set forth in claim 1 and in addition comprising a resettable incremental stepper motor, a ratchet in said motor having a number of teeth corresponding to the number of packages to be dispensed; switch means operated by said stepper motor in the circuit between the momentarily closable selector switch and said relay operating the normally open triple contact switch, the stepper motor opening and holding open said latter switch operated by it until reset after delivery of the total number of packages to be dispensed.

3. An operating circuit as set forth in claim 2 and in addition comprising a safety circuit having a relay operated double pole-double throw switch, one pair of normally closed contacts serving to complete the primary circuit of the manually operated selector switch in normal functioning of said latching relay, said relay in the safety circuit being energized should the contacts of the latching means fail to release, and providing a circuit to keep the relay energized and interrupt the motor operating circuit.

References Cited in the file of this patent

UNITED STATES PATENTS

| | | |
|---|---|---|
| 481,331 | Pickard | Aug. 23, 1892 |
| 502,722 | Howe | Aug. 8, 1893 |

(Other references on following page)

UNITED STATES PATENTS

| | | |
|---|---|---|
| 910,906 | Cook | Jan. 26, 1909 |
| 945,126 | Karr | Jan. 4, 1910 |
| 977,437 | Davis | Dec. 6, 1910 |
| 1,131,955 | Quigley | Mar. 16, 1915 |
| 1,459,504 | Grover | June 19, 1923 |
| 1,564,540 | Dinwiddie | Dec. 8, 1925 |
| 1,718,102 | Bauer | June 18, 1929 |
| 1,903,067 | Richardson | Mar. 28, 1933 |
| 1,925,677 | Richardson | Sept. 5, 1933 |
| 2,227,196 | Nicholson | Dec. 31, 1940 |
| 2,289,807 | Schaevitz | July 14, 1942 |
| 2,606,803 | Whelan | Aug. 12, 1952 |